Aug. 16, 1966    V. DEBS    3,266,156
DRAFTSMAN'S AND ENGINEER'S DRAWING AND TRIGONOMETRIC INSTRUMENT
Filed Oct. 15, 1964
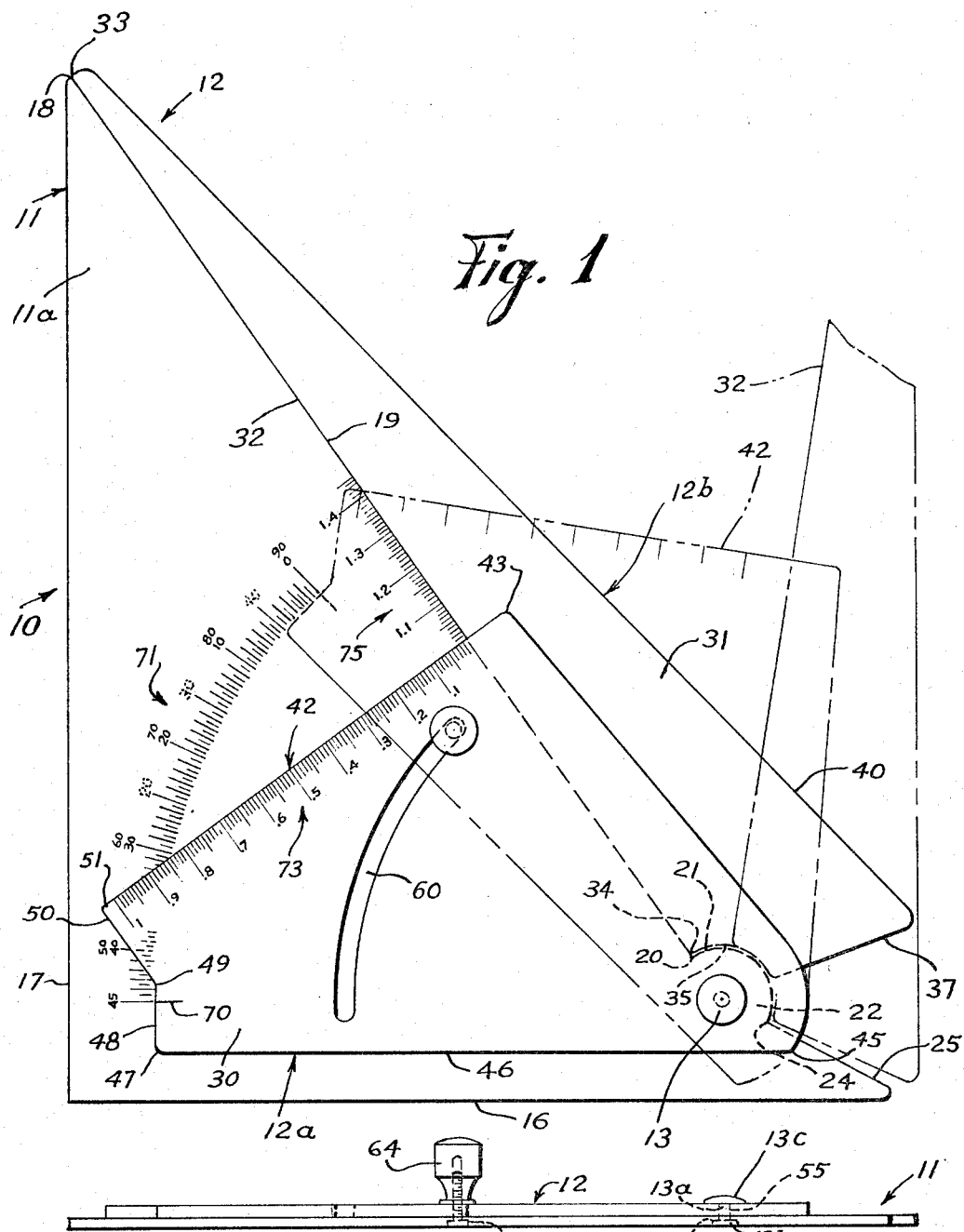
INVENTOR.
VICTOR DEBS
BY 3,266,156
DRAFTSMAN'S AND ENGINEER'S DRAWING AND TRIGONOMETRIC INSTRUMENT
Victor Debs, 103 St. Marks Place, Staten Island, N.Y.
Filed Oct. 15, 1964, Ser. No. 404,026
15 Claims. (Cl. 33—93)

This invention relates to a draftsman's and engineer's drawing and trigonometric instrument.

An object of this invention is to provide a highly improved instrument of the character described, comprising two parts pivoted together, scale means to measure the angle between a straight edge on one part and a straight edge on the other part, and the angle of movement of one part relative to the other part, direct reading scale means giving the tangent and secant of the angle of movement between said parts and numerator and denominator scale readings of fractions corresponding to the sine, cosine, cotangent and cosecant of said angle of movement.

A further object of this invention is to provide an instrument of the character described in which said two inter pivoted parts have flat coplanar portions provided with straight edges which pass through the pivoted axis of said parts and abut one another in one relative position of said parts.

Yet another object of this invention is to provide an instrument of the character described in which one of the interpivoted parts has an extension lying on the other parts, and projecting beyond the abutting edge of said one part, and having an edge at right angles to said abutting edge of said one part and spaced from the pivotal axis of said parts, and adapted to cross the abutting edge of said other part.

Still another object of this invention is to provide an instrument of the character described, in which said right angle edge of said extension is scaled to correspond to divisions of the distance from the meeting point of said right angle edge and said abutting edge of said one part to the pivotal axis of said parts, said scale being in tenths and subdivisions thereof and extending from said meeting point outward.

A still further object of this invention is to provide an instrument of the character described in which the abutting edge of said other part is scaled from a point on said scale where said edge on said extension crosses said abutting edge in said other part, when said abutting edges are in abutment, outwardly thereof, by a scale similar to the scale on said edge on said extension.

Still another object of this invention is to provide a durable instrument of the character described which shall be relatively inexpensive to manufacture, easy to manipulate and read, and which shall yet be practical and efficient to a high degree in use.

Other objects of this invention will in part be obvious and in part hereinafter pointed out.

The invention accordingly consists in the features of construction, combination of elements, and arrangement of parts, which will be exemplified in the construction hereinafter described, and of which the scope of invention will be indicated in the following claims.

In the accompanying drawing in which is shown an illustrative embodiment of the invention:

FIG. 1 is a top plan view of an instrument embodying the invention and showing the position of the two interpivoted parts with their abutting edges in abutting relation, in full lines, and showing one of the parts in another position with the abutting edges spaced apart, in dot-dash lines, and FIG. 2 is a bottom edge view of the structure shown in full lines in FIG. 1.

Referring now in detail to the drawing, 10 designates an instrument embodying the invention and comprising parts 11 and 12 interpivoted by a pivot pin 13.

Part 11 comprises a plate 11a generally in the shape of a triangle and flat. It is made of light transmitting plastic. It has a lower edge 16 from the left side of which extends a straight edge 17 at right angles thereto. Edge 17 terminates as an apex 18. Extending from apex 18 is a straight edge 19 inclined downwardly and to the right at less than 45° to edge 17. Edge 19 terminates above lower edge 16 at a point 20. Extending from point 20 is an outwardly curved, substantially semi-circular edge 21 forming a substantially semi-circular, outwardly extending lug 22. The center of curvature of edge 21 is the axis of pivot pin 13 and is in alignment with edge 19.

Said curved edge 21 extends to a point 24 somewhat less than 180° from point 20. Extending from point 24 is an edge 25 at an angle to lower edge 16, less than the angle of edge 19 to said lower edge. Said plate 11a has a counterbored through hole 27 to receive part of the pivot pin 13, as will appear hereinafter.

Plate 11a is also formed for the purpose hereinafter explained, with a counterbored opening 29, adjacent edge 19 and in spaced relation to the axis of the pivot pin 13.

Part 12 may also be made of synthetic plastic, light transmitting material, of the kind of which draftsman's triangles are usually made. Said part 12 comprises, a top flat portion 12a disposed in a plan above the plane of plate 11a and a flat portion 12b in the plane of said plate. Said two portions 12a and 12b may be made as a single piece or as two pieces attached together by fusing, riveting or in any other suitable manner.

Top portion 12a partly overlaps bottom portion 12b and has an extension 30 extending beyond said bottom portion. Portion 12b has an extension 31 extending beyond portion 12a.

Bottom portion 12b has an edge 32 which abuts edge 19 and extends up to an apex 33 adjacent apex 18. Edge 32 extends down to a point 34 adjacent point 20 when edges 19, 32 are abutting. Extending from point 34 is an edge 35 defining a notch following the curvature of edge 21 in closely spaced relation thereto, but of lesser angular extent, terminating at a point 36 from which extends an edge 37 inclined upwardly somewhat and to the right, when edges 19, 32 are in abutting relation. The outer end of edge 37 terminates in an apex 38 connected to apex 33 by an edge 40 forming an acute angle with edge 32. Edge 40, when edges 19, 33 abut one another, is at 45° to edge 16. It will be noted that edge 37 forms an angle of somewhat more than 45° with edge 25, when edges 19, 32 abut.

Portion 12a has a straight edge 42 at right angles to and crossing edge 32, and of a length greater than the distance from the axis of pivot 13 to the point where edge 42 crosses edge 32. Edge 42 extends over portion 12b and terminates at point 43. From point 43, portion 12a has an edge 44 running along edge 32 in spaced relation thereto. Edge 44 curves down around edge 37 in spaced relation to edge 21 of plate 11a, terminating at a point 45 below the pivot pin 13. Extending from point 45 is a straight edge 46 parallel to edge 16, when edges 19, 32 are abutting one another. At its left end, edge 46 terminates short of edge 17, at point 47. Extending up from point 47 is an edge 48 parallel to and spaced inwardly of edge 17, when edges 19, 32 abut. Edge 48 terminates at 49, somewhat above the horizontal level of the axis of pivot pin 13, when the instrument is in closed position (edges 19, 32 abutting).

Extending from point 49 is an edge 50 at right angles to edge 42 and extending to said latter edge, at point 51.

It will now be understood that edges 32, 35, 37, 44, 42 define the area at which portions 12a, 12b overlap and are fixed together or are united as one piece.

Extension 30 is formed with a through opening 55 registering with counterbored opening 27. The pivot pin 13 has a shank 13a passing through opening 55 and through the reduced dimension portion of opening 27, a flange 13b in the countersunk or enlarged portion of opening 27, and a flat head 13c above portion 12a. The extension 30 lies flat on plate 11a.

Said extension 30 is formed with an arcuate slot 60, the center of the radius of curvature of which is the axis of pivot pin 13. Opening 29 registers with said arcuate slot.

Extending through opening 29 and fixed to plate 11a is a screw 61 projecting through slot 60 and above the top surface of extension 30. A nut 64 is screwed to the upper end of the screw, to clamp parts 11 and 12 together in angularly adjusted positions. The slot 60 is of such angular extent that it will allow part 12 to be rotated through an angle of 45°.

Extension 30, in its upper surface, is marked or engraved with a marker 70 at the horizontal level of the axis of pivot pin 13.

The upper face of plate 11a is marked with a scale 71 in degrees and subdivisions thereof, beginning at a point opposite marker 70 and extending upward in an arc following said marker as part 12 is swung in a direction to move edge 32 away from edge 19 through an angle of 45°. Thus, scale 71 has an angular extension of 45°. It may have markings in degrees extending from the upper end of the scale down to the lower end of the scale with numerals indicating 0°, 10°, 20°, 30°, 40° and 45° in full lines. It may also have numerals indicating 50°, 60°, 70°, 80° and 90° above said full line numerals 40°, 30°, 20°, 10° and 0° markings, respectively. It may also have dotted line numeral markings of 10°, 20°, 30° and 40° midway between the full line numerals 40°, 30°; the 30°, 20°; the 20°, 10°; and the 10°, 0° marks respectively.

The full line numerals 0°, 10°, 20°, 30°, 40°, 45° indicate degrees between edges 40 and 17. The 50°, 60°, 70°, 80°, 90° numerals indicate the angle between edges 40 and 16. Dotted line numerals 10°, 20°, 30°, 40° indicate the angle between edges 19 and 32.

Part 12a, at its upper face is formed with a scale 73 beginning at the point where edges 32 and 42 cross. The length of this scale 73 is equal to the distance from said point of crossing to the axis of pivot pin 13. Scale 73 is divided into 10 equal parts, each of which is divided into 10 equal parts, so that the scale can be read as a number in the hundreds parts of the whole length of the scale, the whole length being equal to "one." When edges 19, 32 abut, the crossing point of edges 32, 42 is the same as crossing point of edges 19, 42.

Plate 11a is marked with a scale 75, beginning at said crossing point of edges 19 and 42 when edges 19, 32 abut, and extends upwardly along edge 19. Scale 75 may be somewhat less than half the length of scale 73. The scale is similar thereto except that it begins at said crossing point and extends about to .45 of scale 73. Scale 73 has numerals .1 to 1. Scale 75 has numerals 1.1 to 1.4 with some subdivisions therebeyond.

The use of scales 73, 75 will now be explained. When part 12 is swung relative to part 11, a triangle is formed defined by edges 19, 32 and 42. The base of this triangle is always edge 32 from the axis of the pivot pin 13 to the crossing point of edges 42, 32. The value of the length of the base of this triangle is always "1." When edges 19, 32 abut, the apex angle of the triangle is zero and the hypothenuse is 1 (same as base). As the edge 32 moves away from edge 19, the angle between edges 19, 32 can be read on scale 71 by reading on the dotted line numerals 10°, 20°, 30°, 40° and subdivisions of the scale.

The tangent of this angle can then be read directly on scale 73, since the tangent is the reading on the scale over "1." The tangent of this angle is the length of the edge 42 from the crossing point of edges 42, 32 to the crossing point of edges 42, 19, over the length of edge 32 from said crossing point to the axis of pivot pin 13. The length of the latter has the value of "1."

The secant of the angle can be read directly on the scale 75 since the secant of the angle is the length of the hypothenuse of the angle (edge 19 from pivot pin axis to crossing point of edges 42, 19) over length of edge 32 from crossing point of edges 42, 32 to the pivot pin axis (value of "1").

The sine of this angle will be a fraction whose numerator is the reading on scale 73 and whose denominator is the reading on scale 75.

The cosine of the angle is a fraction whose numerator is 1 and whose denominator is the reading on scale 75.

The cotangent of this angle is a fraction the numerator of which is "1" and whose denominator of which is the reading on scale 73.

The cosecant of the angle is a fraction, the numerator of which is the reading on scale 75 and the denominator of which is the reading on the scale 73.

It will thus be seen that there is provided an apparatus and method in which the several objects of this invention are achieved and which is well adapted to meet the conditions of practical use.

As possible embodiments might be made of the above invention, and as various changes might be made in the embodiment above set forth, it is to be understood that all matter herein set forth or shown in the accompanying drawings is to be interpreted as illustrative and not in a limiting sense.

I claim:

1. An instrument comprising a first flat member having a straight edge, a second member having a first portion in the plane of said first member, and a second portion fixed relative to said first portion and overlying said flat member and having sliding contact therewith, means to pivot said second portion to said first member, said straight edge of said first member being in a line passing through the axis of said pivot means, said first portion of said second member having a straight edge adapted to abut the straight edge of said first member in one relative position of said first and second members, and being in a line passing through the axis of said pivot means, and said second portion of said second member having a straight edge at right angles to the straight edge of said second member and crossing said straight edge of said first member.

2. The combination of claim 1, and a scale along said straight edge on said second portion of said second member in divisions of a distance from the crossing point of said straight edges on said first and second portions of said second member, to the axis of said pivot means.

3. The combination of claim 2 and a scale along a portion of the straight edge on said first member, beginning at a point thereon where said straight edge on said second portion of said second member crosses said straight edge on said first member when said straight edges on said first member and first portion of said second member abut, and extending away from said axis, said scale also having divisions of said distance.

4. The combination of claim 3, and said first member and said second portion of said second member having means to limit relative angular movement between said first and second members.

5. The combination of claim 4, said first member having an arcuate scale in degrees and said second portion of said second member having a marker positioned thereon to be located at the respective ends of said arcuate scale when said second member is at its opposite limit positions relative to said first member.

6. The combination of claim 1, said first member having a pair of straight edges at right angles to one another, said first portion of said second member having a straight edge disposed at 45° to said pair of straight edges when the first mentioned straight edges of said first member and first portion of said second member are in abutment.

7. The combination of claim 5, said first member having a pair of straight edges at right angles to one another, said first portion of said second member having a straight edge disposed at 45° to said pair of straight edges when the first mentioned straight edges of said first member and first portion of said second member are in abutment.

8. The combination of claim 4, said limiting means comprising an arcuate slot in said second portion of said second member and a pin on said first member and passing through said slot.

9. In combination, a pair of members, means to pivot said members together, said members each having a first straight edge on a line passing through the axis of said pivot means, and adapted to abut each other in one relative position of said members, and one of said members having a portion overlying the other member and provided with a second straight edge at right angles to said straight edge of said one member and crossing the straight edge of the other of said members.

10. The combination of claim 9, a scale at said second straight edge in divisions of the distance from the crossing point of said second straight edge, the first straight edge of said one member, to the axis of said pivotal point, and a scale on the straight edge of said other member beginning at a point where said second straight edge crosses the straight edge of said other member when said abutable edges abut, and extending outwardly of said point and also being in divisions of said distance.

11. The combination of claim 10, said other member having a pair of straight edges at right angles to one another and substantially forming a triangle with the first straight edge of said other member, and said one member having a straight edge at 45° to said pair of straight edges when said abutable edges abut.

12. The combination of claim 11, said other member having an arcuate 45° scale in degrees, and said one member having a marker adapted to move along said arcuate scale as said members have relative movement.

13. The combination of claim 12, and means to limit relative movement of said members.

14. An instrument comprising a pair of interpivoted parts each having a first straight edge on a line passing through the pivotal axis of said parts, said first straight edges being adapted to abut each other, and a second straight edge at right angles to the first straight edge on said one part and crossing the first straight edge on the other part, as the angle between the first straight edges varies, to form a triangle, direct reading scale means on one part to bive the tangent of the angle between said first pair of straight edges, and direct reading scale means on the other part to give the secant of the angle between said first mentioned straight edges.

15. The combination of claim 14, and said other part having a pair of edges at right angles to one another, said one part having another straight edge at 45° to said pair of edges which are at right angles to one another when said first straight edges abut, and means interconnecting said parts to limit relative angular movement therebetween.

References Cited by the Examiner

UNITED STATES PATENTS

| 29,767 | 8/1860 | Chisholm | 33—75 |
| 2,078,138 | 4/1937 | Hansen | 235—61 |
| 2,867,906 | 1/1959 | Lee | 33—93 |

FOREIGN PATENTS

| 21,935 | 1903 | Great Britain. |
| 648,361 | 1/1951 | Great Britain. |

LEONARD FORMAN, *Primary Examiner.*

ISAAC LISANN, *Examiner.*

H. N. HAROIAN, *Assistant Examiner.*